US012658701B2

(12) United States Patent     (10) Patent No.:   US 12,658,701 B2
Tahata et al.           (45) Date of Patent:     Jun. 16, 2026

(54) FREQUENCY STABILIZER FOR ENERGY STORAGE SYSTEM

(71) Applicant: Mitsubishi Electric Corporation, Tokyo (JP)

(72) Inventors: Kazuyori Tahata, Tokyo (JP); Frederick Page, Tokyo (JP); Yoshiyuki Kono, Tokyo (JP); Masatoshi Takeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 190 days.

(21) Appl. No.: 18/705,633

(22) PCT Filed: Nov. 22, 2021

(86) PCT No.: PCT/JP2021/042795
§ 371 (c)(1),
(2) Date: Apr. 29, 2024

(87) PCT Pub. No.: WO2023/089828
PCT Pub. Date: May 25, 2023

(65) Prior Publication Data
US 2025/0015595 A1     Jan. 9, 2025

(51) Int. Cl.
*H02M 7/00*      (2006.01)
*H02J 3/0014*     (2026.01)
(Continued)

(52) U.S. Cl.
CPC ............ *H02J 3/00142* (2026.01); *H02J 3/28* (2013.01); *H02M 3/158* (2013.01); *H02M 7/68* (2013.01); *H02J 2105/12* (2026.01)

(58) Field of Classification Search
CPC .......... H02J 3/241; H02J 3/28; H02J 2310/12; H02M 3/003; H02M 7/003; H02M 7/48
See application file for complete search history.

(56) References Cited

U.S. PATENT DOCUMENTS 4,691,274 A     9/1987   Matouk et al.
2011/0118886 A1   5/2011   Muneshima et al.
(Continued)

FOREIGN PATENT DOCUMENTS

CN     205137311 U     4/2016
CN     212966083 U     4/2021
(Continued)

OTHER PUBLICATIONS

Extended European Search Report dated Sep. 24, 2024, issued in the corresponding European Patent Application No. 21964841.7, 9 pages.
(Continued)

*Primary Examiner* — Sisay G Tiku
(74) *Attorney, Agent, or Firm* — .Buchanan Ingersoll & Rooney PC

(57) ABSTRACT

A frequency stabilizer includes a bidirectional AC/DC converter, a bidirectional DC/DC converter, a first energy storage system, a second energy storage system, and a building. The bidirectional AC/DC converter is connected between an AC power system and the first energy storage system. The bidirectional DC/DC converter is connected between the first energy storage system and the second energy storage system. Two or more of the first energy storage system, the second energy storage system, the bidirectional AC/DC converter, and the bidirectional DC/DC converter are disposed inside the building.

10 Claims, 9 Drawing Sheets

(51) Int. Cl.

| | |
|---|---|
| *H02J 3/28* | (2026.01) |
| *H02M 3/00* | (2006.01) |
| *H02M 3/158* | (2006.01) |
| *H02M 7/48* | (2007.01) |
| *H02M 7/68* | (2006.01) |
| H02J 105/12 | (2026.01) |

(56) References Cited

U.S. PATENT DOCUMENTS

| | | | |
|---|---|---|---|
| 2012/0235471 A1 | 9/2012 | Tanahashi et al. | |
| 2013/0234517 A1 | 9/2013 | Uchida | |
| 2016/0072361 A1 | 3/2016 | Kuramochi et al. | |
| 2017/0151886 A1* | 6/2017 | Oguma | B60L 50/51 |
| 2019/0052079 A1 | 2/2019 | Kubota et al. | |
| 2024/0146066 A1* | 5/2024 | Page | H02J 3/381 |
| 2024/0396426 A1* | 11/2024 | Yoshida | H02M 7/217 |
| 2025/0015596 A1* | 1/2025 | Page | H02J 7/0013 |

FOREIGN PATENT DOCUMENTS

| | | | | | |
|---|---|---|---|---|---|
| CN | 114884181 A | * | 8/2022 | ........ | H02J 7/007182 |
| DE | 112014001112 T5 | | 12/2015 | | |
| DE | 102012005902 B4 | | 3/2020 | | |
| JP | 2004120918 A | | 4/2004 | | |
| JP | 2009136058 A | | 6/2009 | | |
| JP | 2021158884 A | | 10/2021 | | |
| WO | 2009136641 A1 | | 11/2009 | | |
| WO | 2013136413 A1 | | 9/2013 | | |
| WO | 2017145316 A1 | | 8/2017 | | |

OTHER PUBLICATIONS

Esmaili, et al., "A Hybrid System of Li-lon Capacitors and Flow Battery for Dynamic Wind Energy Support", IEEE Transactions on Industry Applications, vol. 49, No. 4, Jul. 2013, pp. 1649-1657.

International Search Report (PCT/ISA/210) with translation and Written Opinion (PCT/ISA/237) mailed on Feb. 15, 2022, by the Japanese Patent Office as the International Searching Authority for International Application No. PCT/JP2021/042795. (11 pages).

* cited by examiner

FREQUENCY STABILIZER FOR ENERGY STORAGE SYSTEM

TECHNICAL FIELD

The present disclosure relates to a frequency stabilizer.

BACKGROUND ART

International Publication No. WO2017/145316 (PTL 1) discloses an interconnected system facility. The interconnected system facility disclosed in PTL 1 includes a storage battery system and a power converter connected between the storage battery system and an alternating-current (AC) power system. The power converter is an AC/direct-current (DC) converter. In the following description, this power converter is referred to as a "first power converter". In the interconnected system facility disclosed in PTL 1, the power of the AC power system is converted into a direct current in the first power converter and then stored in the storage battery system, and the power stored in the storage battery system is converted into an alternating current in the first power converter and then discharged to the AC power system.

CITATION LIST

Patent Literature

PTL 1: International Publication No. WO 2017/145316

SUMMARY OF INVENTION

Technical Problem

In the interconnected system facility disclosed in PTL 1, the input/output voltage of the storage battery system decreases as the state of charge (SOC) of the storage battery system decreases, and the input/output voltage of the storage battery system increases as the SOC of the storage battery system increases. There is a limit in the voltage range in which the first power converter can be stably controlled. Thus, in the interconnected system facility disclosed in PTL 1, unless the input/output voltage of the storage battery system falls within this voltage range, charging or discharging of the storage battery system through the first power converter cannot be performed.

In order to solve the above-described problem, it is conceivable to connect another power converter (hereinafter referred to as a "second power converter") between the first power converter and the storage battery system. The second power converter is a DC/DC converter. In this configuration, the second power converter serving as a DC/DC converter includes a reactor and the current response speed is limited, which makes it difficult to attain a high-speed response.

In order to solve the above-described problem, it is conceivable to connect another energy storage system different from the storage battery system between the first power converter and the second power converter. In this configuration, a high-speed response and a higher output can be attained, but when the components are respectively disposed inside different buildings, the total number of pieces of auxiliary equipment increases.

The present disclosure has been made in view of the above-described problems. More specifically, the present disclosure provides a frequency stabilizer capable of attainting a high-speed response and a higher output while reducing the total number of pieces of auxiliary equipment.

Solution to Problem

A frequency stabilizer according to the present disclosure includes a bidirectional AC/DC converter, a bidirectional DC/DC converter, a first energy storage system, a second energy storage system, and a building. The bidirectional AC/DC converter is connected between an AC power system and the first energy storage system. The bidirectional DC/DC converter is connected between the first energy storage system and the second energy storage system. Two or more of the first energy storage system, the second energy storage system, the bidirectional AC/DC converter, and the bidirectional DC/DC converter are disposed inside the building.

Advantageous Effects of Invention

The frequency stabilizer according to the present disclosure is capable of attaining a high-speed response and a higher output while reducing the total number of pieces of auxiliary equipment.

BRIEF DESCRIPTION OF DRAWINGS

FIG. 8 is a schematic configuration diagram of a frequency stabilizer 300.

DESCRIPTION OF EMBODIMENTS

Figure 1:
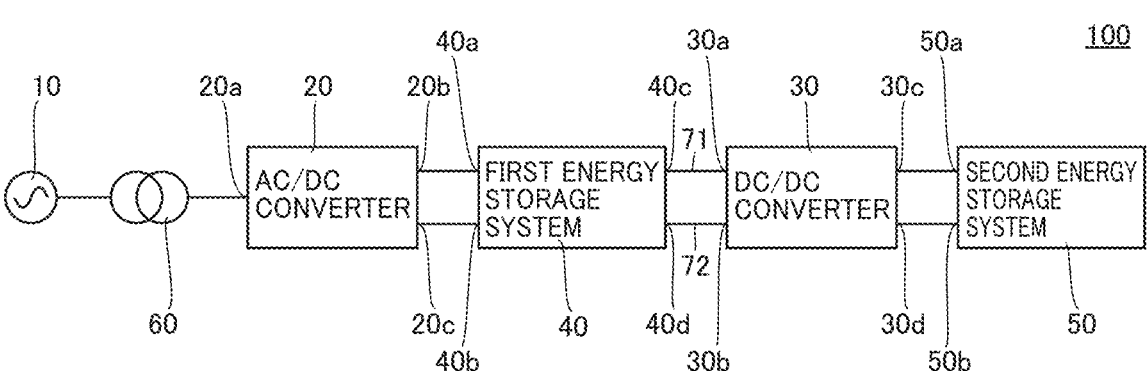
FIG. 1 is a schematic configuration diagram of a frequency stabilizer 100.

Details of embodiments of the present disclosure will be hereinafter described with reference to the accompanying drawings. In the accompanying drawings, the same or corresponding portions are denoted by the same reference characters, and the same description will not be repeated.

First Embodiment

A frequency stabilizer according to the first embodiment will be described. The frequency stabilizer according to the first embodiment is referred to as a frequency stabilizer 100.

Configuration of Frequency Stabilizer 100

The following describes the configuration of frequency stabilizer 100.

FIG. 1 is a schematic configuration diagram of frequency stabilizer 100. As shown in FIG. 1, frequency stabilizer 100 includes an AC/DC converter 20, a DC/DC converter 30, a first energy storage system 40, and a second energy storage system 50. AC/DC converter 20 is connected between an AC power system 10 and first energy storage system 40. DC/DC converter 30 is connected between first energy storage system 40 and second energy storage system 50.

AC/DC converter 20 includes an AC terminal 20a, a DC terminal 20b, and a DC terminal 20c. DC terminals 20b and 20c are a positive-side terminal and a negative-side terminal, respectively. AC terminal 20a is connected to AC power system 10 via a transformer 60. AC/DC converter 20 converts AC power input from AC terminal 20a into DC power, and outputs the converted DC power from DC terminals 20b and 20c. AC/DC converter 20 converts DC power input from DC terminals 20b and 20c into AC power, and outputs the converted AC power from AC terminal 20a. In other words, AC/DC converter 20 is a bidirectional AC/DC converter.

DC/DC converter 30 has terminals 30a and 30b, and terminals 30c and 30d. Terminals 30a and 30b are a positive-side terminal and a negative-side terminal, respectively, and terminals 30c and 30d are a positive-side terminal and a negative-side terminal, respectively. DC/DC converter 30 raises or lowers the DC power input from terminals 30a and 30b, and outputs the DC power from terminals 30c and 30d, and also, raises or lowers the DC power input from terminals 30c and 30d and outputs the DC power from terminals 30a and 30b. In other words, DC/DC converter 30 is a bidirectional DC/DC converter.

Figure 2:
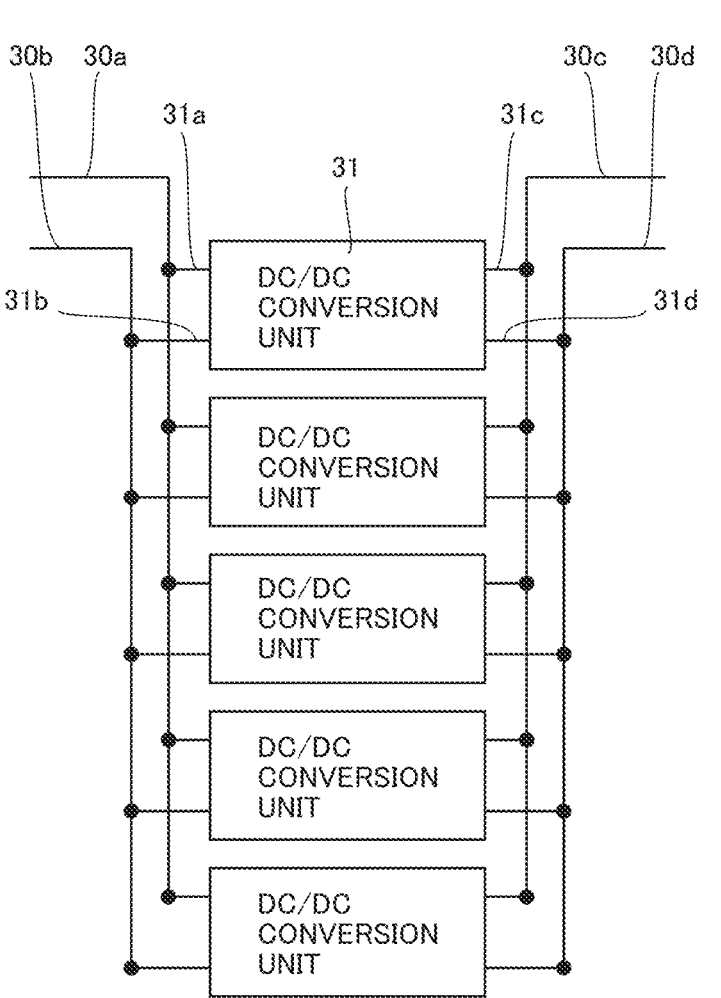
FIG. 2 is a schematic configuration diagram of a DC/DC converter 30.

FIG. 2 is a schematic configuration diagram of DC/DC converter 30. As shown in FIG. 2, DC/DC converter 30 is constituted, for example, of a plurality of DC/DC conversion units 31. The plurality of DC/DC conversion units 31 are connected in parallel to each other. DC/DC conversion unit 31 has terminals 31a and 31b, and terminals 31c and 31d. Terminals 31a, 31b, 31c, and 31d are connected to terminals 30a, 30b, 30c, and 30d, respectively.

Figure 3:
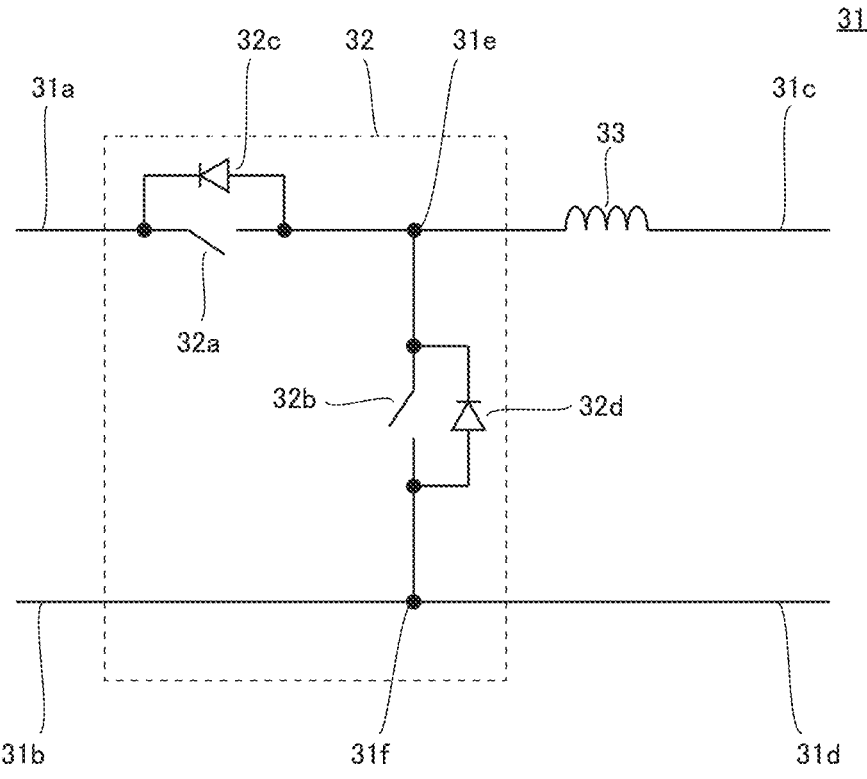
FIG. 3 is a schematic circuit configuration diagram of a DC/DC conversion unit 31.

FIG. 3 is a schematic circuit configuration diagram of DC/DC conversion unit 31. As shown in FIG. 3, DC/DC conversion unit 31 includes a switching circuit 32 and a reactor 33. Switching circuit 32 includes switching elements 32a and 32b, and diodes 32c and 32d.

Switching element 32a is connected between terminal 31a and an intermediate node 31e. Intermediate node 31e is located at a midpoint between terminals 31a and 31c. Switching element 32b is connected between intermediate nodes 31e and 31f. Intermediate node 31f is located at a midpoint between terminals 31b and 31d. Diode 32c is connected in parallel to switching element 32a and reverse-biased with respect to switching element 32a. Diode 32d is connected in parallel to switching element 32b and reverse-biased with respect to switching element 32b. Reactor 33 is connected between intermediate node 31e and terminal 31c. In this way, DC/DC conversion unit 31 is constituted, for example, by combining a step-up chopper and a step-down chopper.

As shown in FIG. 1, first energy storage system 40 is formed, for example, of an electric double layer capacitor (a supercapacitor). First energy storage system 40 may be formed of a storage battery. In first energy storage system 40, the input/output voltage decreases as the SOC decreases, and the input/output voltage increases as the SOC increases. First energy storage system 40 has terminals 40a and 40b, and terminals 40c and 40d. Terminal 40a is connected to DC terminal 20b. Terminal 40b is connected to DC terminal 20c. Terminal 40c is connected to terminal 30a. Terminal 40d is connected to terminal 30b. Terminals 40a and 40b are a positive-side terminal and a negative-side terminal, respectively, and terminals 40c and 40d are a positive-side terminal and a negative-side terminal, respectively.

A line connecting terminals 40c and 30a is referred to as a first line 71. A line connecting terminals 40d and 30b is referred to as a second line 72.

Second energy storage system 50 is formed, for example, of an electric double layer capacitor. Second energy storage system 50 may be formed of a storage battery. In second energy storage system 50, the input/output voltage decreases as the SOC decreases, and the input/output voltage increases as the SOC increases. Second energy storage system 50 has terminals 50a and 50b. Terminal 50a is connected to terminal 30c. Terminal 50b is connected to terminal 30d. Terminals 50a and 50b are a positive-side terminal and a negative-side terminal, respectively. Second energy storage system 50 is preferably greater in energy storage capacity than first energy storage system 40.

Figure 4:
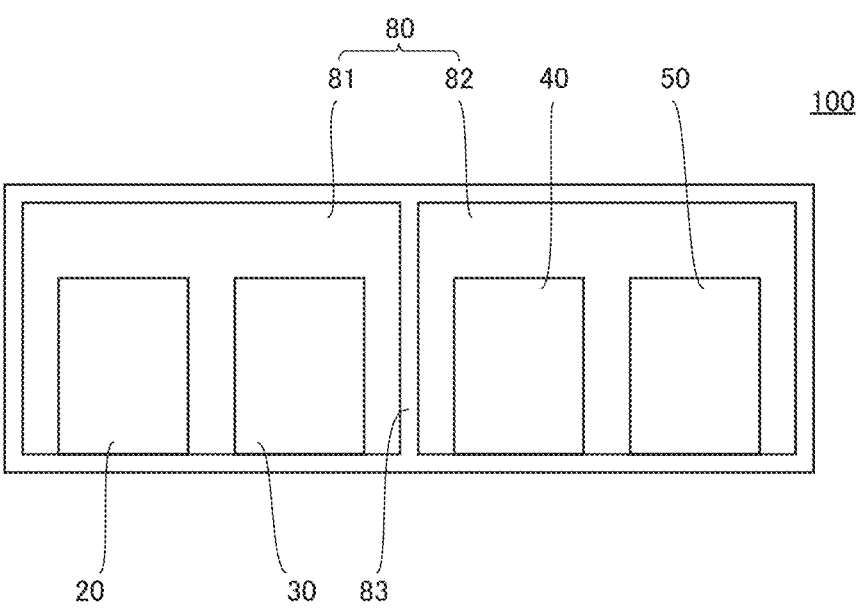
FIG. 4 is a layout diagram of frequency stabilizer 100.

FIG. 4 is a layout diagram of frequency stabilizer 100. As shown in FIG. 4, frequency stabilizer 100 includes a building 80. Building 80 includes a plurality of rooms. In the example shown in FIG. 4, the number of rooms included in building 80 is two, and these rooms are referred to as a first chamber 81 and a second chamber 82. First chamber 81 and second chamber 82 are defined by a wall 83. First chamber 81 and second chamber 82 are aligned in the horizontal direction.

In the example shown in FIG. 4, AC/DC converter 20, DC/DC converter 30, first energy storage system 40, and second energy storage system 50 are disposed inside building 80. It should be noted that at least two of AC/DC converter 20, DC/DC converter 30, first energy storage system 40, and second energy storage system 50 should only be disposed inside building 80, and the remainder of AC/DC converter 20, DC/DC converter 30, first energy storage system 40, and second energy storage system 50 may be disposed inside another building different from building 80.

Figure 5:
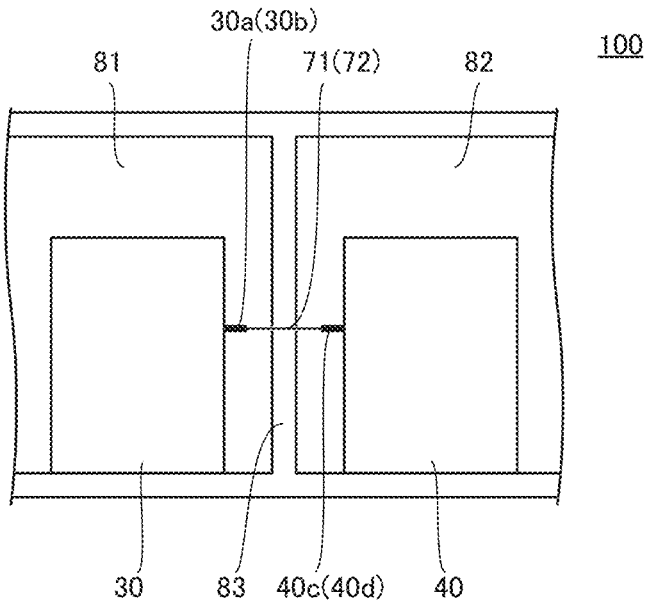
FIG. 5 is a detailed layout diagram of frequency stabilizer 100.

In the example shown in FIG. 4, AC/DC converter 20 and DC/DC converter 30 are disposed in first chamber 81, and first energy storage system 40 and second energy storage system 50 are disposed in second chamber 82. Preferably, DC/DC converter 30 and first energy storage system 40 are disposed side by side in the horizontal direction with wall 83 interposed therebetween. FIG. 5 is a detailed layout diagram of frequency stabilizer 100. As shown in FIG. 5, terminals 30c and 30d preferably face wall 83, and terminals 40c and 40d preferably face wall 83.

It should be noted that one of AC/DC converter 20 and DC/DC converter 30 may be disposed in the same room (for example, first chamber 81) as that of one of first energy storage system 40 and second energy storage system 50, and the other one of AC/DC converter 20 and DC/DC converter 30 may be disposed in the same room (for example, second chamber 82) as that of the other one of first energy storage system 40 and second energy storage system 50.

Frequency stabilizer 100 further includes auxiliary equipment 84 (not shown). Auxiliary equipment 84 includes first auxiliary equipment 85 and second auxiliary equipment 86. First auxiliary equipment 85 is shared inside building 80. First auxiliary equipment 85 is, for example, a pipe and a pump for supplying water to fire extinguishing equipment. Second auxiliary equipment 86 is shared in first chamber 81 or second chamber 82. Second auxiliary equipment 86 is, for example, an air conditioner, an alarm device in case of fire, fire extinguishing equipment, a sensor for the fire extinguishing equipment, an interlock system used when entering a room, an indoor monitoring device such as a monitoring camera, and the like.

Effect of Frequency Stabilizer 100

The following describes the effect of frequency stabilizer 100.

The input/output voltage of second energy storage system 50 decreases as the SOC of second energy storage system 50 decreases, and the input/output voltage of second energy storage system 50 increases as the SOC of second energy storage system 50 increases. There is a limit in the voltage range in which AC/DC converter 20 can be stably controlled. Thus, unless the input/output voltage of second energy storage system 50 falls within this voltage range, charging or discharging of second energy storage system 50 through AC/DC converter 20 cannot be performed.

In frequency stabilizer 100, DC/DC converter 30 adjusts the input/output voltage of second energy storage system 50. Thus, according to frequency stabilizer 100, even when the SOC of second energy storage system 50 changes and the input/output voltage of second energy storage system 50 changes, AC/DC converter 20 can still be stably controlled.

Since DC/DC converter 30 includes a reactor (reactor 33), the current response speed is limited, which makes it difficult to attain a high-speed response. In frequency stabilizer 100, first energy storage system 40 is connected between AC/DC converter 20 and DC/DC converter 30. Thus, when a high-speed response is required, it is possible to first perform charging and discharging by first energy storage system 40 and then perform charging and discharging by second energy storage system 50 through DC/DC converter 30. In this way, according to frequency stabilizer 100, a high-speed response and a higher output can be attained.

In frequency stabilizer 100, AC/DC converter 20, DC/DC converter 30, first energy storage system 40, and second energy storage system 50 are disposed inside building 80. Thus, according to frequency stabilizer 100, first auxiliary equipment 85 is shared for AC/DC converter 20, DC/DC converter 30, first energy storage system 40, and second energy storage system 50, so that the total number of pieces of first auxiliary equipment 85 can be reduced.

In frequency stabilizer 100, AC/DC converter 20 and DC/DC converter 30 are disposed in first chamber 81, and first energy storage system 40 and second energy storage system 50 are disposed in second chamber 82. Thus, according to frequency stabilizer 100, second auxiliary equipment 86 can be shared for AC/DC converter 20 and DC/DC converter 30, and second auxiliary equipment 86 can be shared for first energy storage system 40 and second energy storage system 50, so that the total number of pieces of second auxiliary equipment 86 can be reduced.

When AC/DC converter 20 and DC/DC converter 30 are disposed in different rooms of building 80, it is necessary to contain: two spaces between AC/DC converter 20 and the respective opposing walls of the room; and two spaces between DC/DC converter 30 and the respective opposing walls of the room. On the other hand, when AC/DC converter 20 and DC/DC converter 30 are disposed in one room of building 80, it is sufficient to contain: one space between AC/DC converter 20 and one of the opposing walls of the room; one space between DC/DC converter 30 and the other one of the opposing walls of the room; and a space between AC/DC converter 20 and DC/DC converter 30. This also applies to the space in which first energy storage system 40 and second energy storage system 50 are disposed. Thus, frequency stabilizer 100 allows reduction in the horizontal length required for disposing AC/DC converter 20, DC/DC converter 30, first energy storage system 40, and second energy storage system 50.

In frequency stabilizer 100, terminals 30c and 30d face wall 83 and terminals 40c and 40d face wall 83, so that first line 71 and second line 72 can be shortened. In other words, the stray inductance of each of first line 71 and second line 72 is reduced. The overvoltage caused by switching of DC/DC converter 30 is proportional to the stray inductance of each of first line 71 and second line 72. Thus, according to frequency stabilizer 100, the overvoltage caused by switching of DC/DC converter 30 can be suppressed. Further, in the case where first energy storage system 40 is an electric double layer capacitor, the resonance between first energy storage system 40 and each of first line 71 and second line 72 can also be suppressed.

Modification

The following describes frequency stabilizer 100 according to a modification. Frequency stabilizer 100 according to the modification is referred to as a frequency stabilizer 100A.

Figure 6:
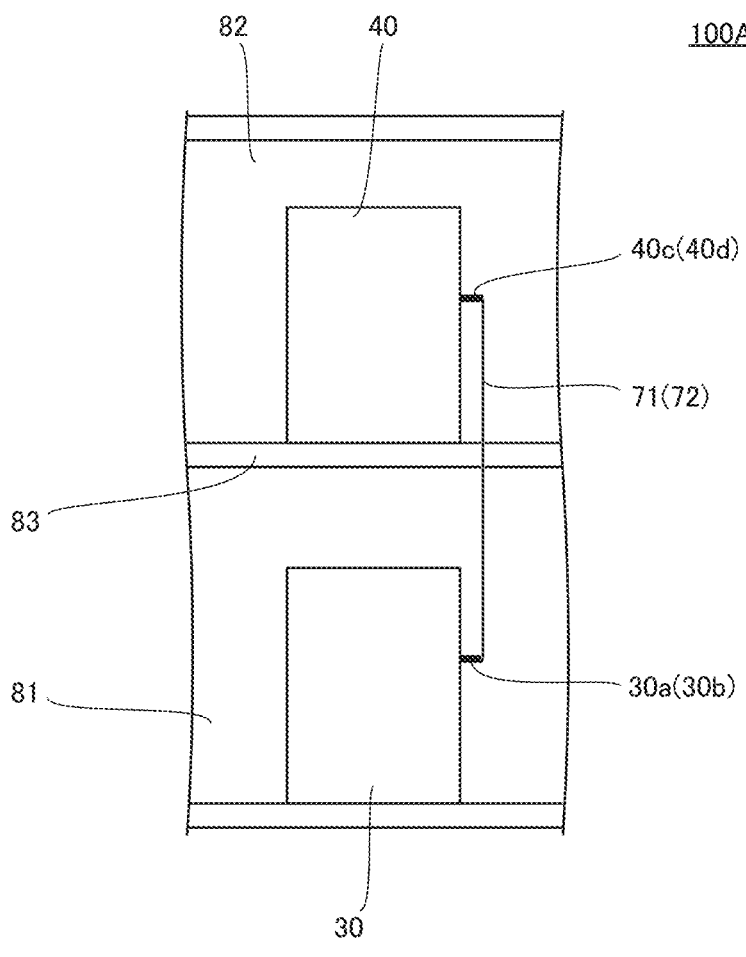
FIG. 6 is a layout diagram of a frequency stabilizer 100A.

FIG. 6 is a layout diagram of frequency stabilizer 100A. FIG. 6 does not show AC/DC converter 20 and second energy storage system 50. As shown in FIG. 6, in frequency stabilizer 100A, first chamber 81 and second chamber 82 are aligned in the vertical direction. In frequency stabilizer 100A, wall 83 is provided as a ceiling of first chamber 81 and as a floor of second chamber 82.

In frequency stabilizer 100A, terminals 30a and 40c are disposed on a straight line extending in the vertical direction, and terminals 30b and 40d are disposed on a straight line extending in the vertical direction. Consequently, according to frequency stabilizer 100A, first line 71 and second line 72 can be shortened, and the stray inductance of each of first line 71 and second line 72 is reduced. Thus, according to frequency stabilizer 100A, the overvoltage caused by switching of DC/DC converter 30 can be suppressed. Further, in the case where first energy storage system 40 is an electric double layer capacitor, the resonance between first energy storage system 40 and each of first line 71 and second line 72 can also be suppressed.

Second Embodiment

A frequency stabilizer according to the second embodiment will be described. The frequency stabilizer according to the second embodiment is referred to as a frequency stabilizer 200. In the following, differences from frequency stabilizer 100 will be mainly described, and the same description will not be repeated.

(Configuration of Frequency Stabilizer 200)

The following describes the configuration of frequency stabilizer 200.

Figure 7:
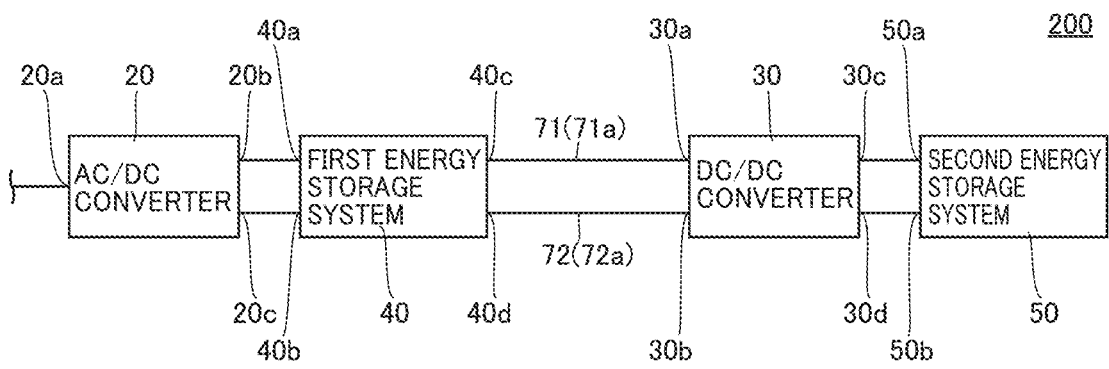
FIG. 7 is a schematic configuration diagram of a frequency stabilizer 200.

FIG. 7 is a schematic configuration diagram of frequency stabilizer 200. As shown in FIG. 7, frequency stabilizer 200 includes AC/DC converter 20, DC/DC converter 30, first energy storage system 40, and second energy storage system 50.

In frequency stabilizer 200, AC/DC converter 20 is connected between AC power system 10 and first energy storage system 40, and DC/DC converter 30 is connected between first energy storage system 40 and second energy storage system 50. In frequency stabilizer 200, DC/DC converter 30 and first energy storage system 40 are connected by first line 71 and second line 72. Regarding the above-described points, frequency stabilizer 200 has the same configuration as that of frequency stabilizer 100.

In frequency stabilizer 200, first line 71 is provided as a power cable 71a, and second line 72 is provided as a power cable 72a. Regarding this point, frequency stabilizer 200 is different in configuration from frequency stabilizer 100.

In frequency stabilizer 200, AC/DC converter 20, DC/DC converter 30, first energy storage system 40, and second energy storage system 50 may or may not be disposed inside the same building 80. In frequency stabilizer 200, AC/DC converter 20 and DC/DC converter 30 may or may not be disposed in the same room of building 80. In frequency stabilizer 200, first energy storage system 40 and second energy storage system 50 may or may not be disposed in the same room of building 80.

Effect of Frequency Stabilizer 200

The following describes the configuration of frequency stabilizer 200.

In the case where first line 71 and second line 72 are power cables, the stray inductance of each of first line 71 and second line 72 is smaller than that in the case where first line 71 and second line 72 are air lines (lines that are not insulation-coated). Therefore, according to frequency stabilizer 200, the overvoltage caused by switching of DC/DC converter 30 can be suppressed. Further, in the case where first energy storage system 40 is an electric double layer capacitor, the resonance between first energy storage system 40 and each of first line 71 and second line 72 can also be suppressed.

Third Embodiment

A frequency stabilizer according to the third embodiment will be described. The frequency stabilizer according to the third embodiment is referred to as a frequency stabilizer 300. In the following, differences from frequency stabilizer 100 will be mainly described, and the same description will not be repeated.

Configuration of Frequency Stabilizer 300

The following describes the configuration of frequency stabilizer 300.

Figure 8:
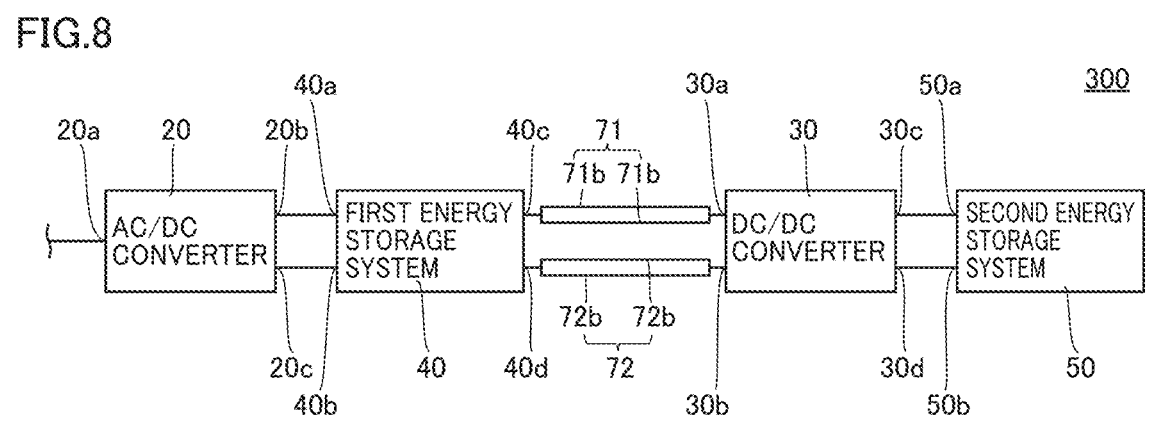

FIG. 8 is a schematic configuration diagram of frequency stabilizer 300. As shown in FIG. 8, frequency stabilizer 300 includes AC/DC converter 20, DC/DC converter 30, first energy storage system 40, and second energy storage system 50.

In frequency stabilizer 300, AC/DC converter 20 is connected between AC power system 10 and first energy storage system 40, and DC/DC converter 30 is connected between first energy storage system 40 and second energy storage system 50. In frequency stabilizer 300, DC/DC converter 30 and first energy storage system 40 are connected by first line 71 and second line 72. Regarding the above-described points, frequency stabilizer 300 has the same configuration as that of frequency stabilizer 100.

In frequency stabilizer 300, first line 71 is constituted of a plurality of lines 71b connected in parallel to each other, and second line 72 is constituted of a plurality of lines 72b connected in parallel to each other. Regarding this point, frequency stabilizer 300 is different in configuration from frequency stabilizer 100.

In frequency stabilizer 300, AC/DC converter 20, DC/DC converter 30, first energy storage system 40, and second energy storage system 50 may or may not be disposed inside the same building 80. In frequency stabilizer 300, AC/DC converter 20 and DC/DC converter 30 may or may not be disposed in the same room of building 80. In frequency stabilizer 300, first energy storage system 40 and second energy storage system 50 may or may not be disposed in the same room of building 80.

Effect of Frequency Stabilizer 300

The following describes the configuration of frequency stabilizer 300.

In the case where each of first line 71 and second line 72 is constituted of a plurality of lines connected in parallel to each other, the combined inductance of first line 71 and second line 72 is reduced due to the parallel connection of the inductances. Thus, according to frequency stabilizer 300, the overvoltage caused by switching of DC/DC converter 30 can be suppressed. Further, in the case where first energy storage system 40 is an electric double layer capacitor, the resonance between first energy storage system 40 and each of first line 71 and second line 72 can also be suppressed.

Fourth Embodiment

A frequency stabilizer according to the fourth embodiment will be described. The frequency stabilizer according to the fourth embodiment is referred to as a frequency stabilizer 400. In the following, differences from frequency stabilizer 100 will be mainly described, and the same description will not be repeated.

Configuration of Frequency Stabilizer 400

The following describes the configuration of frequency stabilizer 400.

Figure 9:
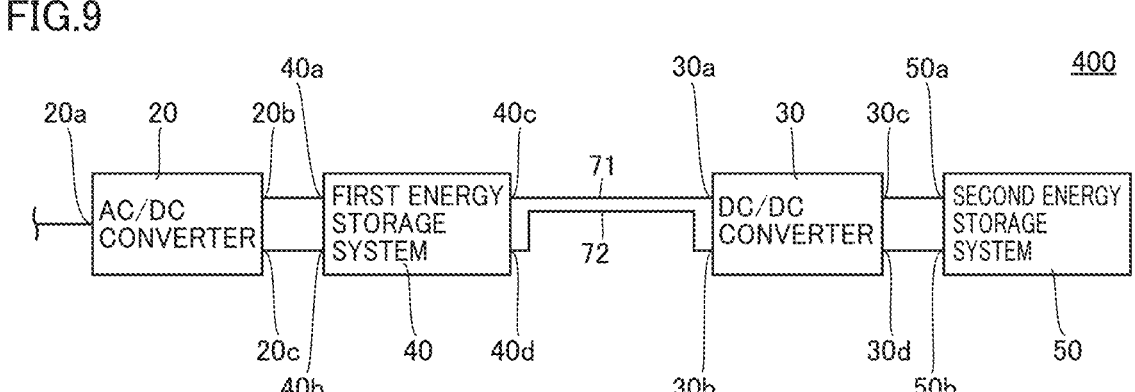
FIG. 9 is a schematic configuration diagram of a frequency stabilizer 400.

FIG. 9 is a schematic configuration diagram of frequency stabilizer 400. As shown in FIG. 9, frequency stabilizer 400 includes AC power system 10, AC/DC converter 20, DC/DC converter 30, first energy storage system 40, and second energy storage system 50. In frequency stabilizer 400, AC/DC converter 20 is connected between AC power system 10 and first energy storage system 40, and DC/DC converter 30 is connected between first energy storage system 40 and second energy storage system 50. In frequency stabilizer 400, DC/DC converter 30 and first energy storage system 40 are connected by first line 71 and second line 72. Regarding the above-described points, frequency stabilizer 400 has the same configuration as that of frequency stabilizer 100.

In frequency stabilizer 400, first line 71 and second line 72 are disposed close to each other. More specifically, in frequency stabilizer 400, the distance between first line 71 and second line 72 is equal to or less than the inter-terminal distance between terminals 31a and 31b. Regarding the above-described point, frequency stabilizer 400 is different in configuration from frequency stabilizer 100.

In frequency stabilizer 400, AC/DC converter 20, DC/DC converter 30, first energy storage system 40, and second energy storage system 50 may or may not be disposed inside the same building 80. In frequency stabilizer 400, AC/DC converter 20 and DC/DC converter 30 may or may not be disposed in the same room of building 80. In frequency stabilizer 400, first energy storage system 40 and second energy storage system 50 may or may not be disposed in the same room of building 80.

Effect of Frequency Stabilizer 400

The following describes the configuration of frequency stabilizer 400.

The direction in which the current flows through first line 71 is always opposite to the direction in which the current flows through second line 72. Thus, in frequency stabilizer 400, first line 71 and second line 72 are disposed close to each other, so that the inductance of first line 71 and the inductance of second line 72 cancel each other out. Thus, according to frequency stabilizer 400, the overvoltage caused by switching of DC/DC converter 30 can be suppressed. Further, in the case where first energy storage system 40 is an electric double layer capacitor, the resonance between first energy storage system 40 and each of first line 71 and second line 72 can also be suppressed.

It should be understood that the embodiments disclosed herein are illustrative and non-restrictive in every respect. The basic scope of the present disclosure is defined by the scope of the claims, rather than the embodiments as described above, and is intended to include any modifications within the meaning and scope equivalent to the scope of the claims.

REFERENCE SIGNS LIST

10 AC power system, 20 AC/DC converter, 20*a* AC terminal, 20*b*, 20*c* DC terminal, 30 DC/DC converter, 30*a*, 30*b*, 30*c*, 30*d* terminal, 31 DC/DC conversion unit, 31*a*, 31*b*, 31*c*, 31*d* terminal, 31*e*, 31*f* intermediate node, 32 switching circuit, 32*a*, 32*b* switching element, 32*c*, 32*d* diode, 33 reactor, 40 first energy storage system, 40*a*, 40*b*, 40*c*, 40*d* terminal, 50 second energy storage system, 50*a*, 50*b* terminal, 60 transformer, 71 first line, 71*a* power cable, 71*b* line, 72 second line, 72*a* power cable, 72*b* line, 80 building, 81 first chamber, 82 second chamber, 83 wall, 84 auxiliary equipment, 85 first auxiliary equipment, 86 second auxiliary equipment, 100, 100A, 200, 300, 400 frequency stabilizer.

The invention claimed is:

1. A frequency stabilizer comprising:
a bidirectional AC/DC converter;
a bidirectional DC/DC converter;
a first energy storage system;
a second energy storage system; and
a building, wherein
the bidirectional AC/DC converter is connected between an AC power system and the first energy storage system,
the bidirectional DC/DC converter is connected between the first energy storage system and the second energy storage system,
two or more of the first energy storage system, the second energy storage system, the bidirectional AC/DC converter, and the bidirectional DC/DC converter are disposed inside the building,
the building includes a plurality of rooms,
the bidirectional AC/DC converter and the bidirectional DC/DC converter are disposed in a first chamber that is one of the plurality of rooms,
the first energy storage system and the second energy storage system are disposed in a second chamber that is another one of the plurality of rooms, and
the first chamber and the second chamber are located in different floors of the building.

2. The frequency stabilizer according to claim 1, wherein the bidirectional AC/DC converter and the bidirectional DC/DC converter are disposed inside the building.

3. The frequency stabilizer according to claim 2, wherein the bidirectional AC/DC converter and the bidirectional DC/DC converter are disposed in one of the plurality of rooms.

4. The frequency stabilizer according to claim 1, wherein the first energy storage system and the second energy storage system are disposed inside the building.

5. The frequency stabilizer according to claim 4, wherein the first energy storage system and the second energy storage system are disposed in one of the plurality of rooms.

6. The frequency stabilizer according to claim 1, wherein the bidirectional DC/DC converter and the first energy storage system are connected by a first line and a second line, and
at least one of the first line and the second line is a power cable.

7. The frequency stabilizer according to claim 1, wherein the bidirectional DC/DC converter and the first energy storage system are connected by a first line and a second line, and
at least one of the first line and the second line is constituted of a plurality of lines connected in parallel to each other.

8. A frequency stabilizer comprising:
a bidirectional AC/DC converter;
a bidirectional DC/DC converter;
a first energy storage system;
a second energy storage system; and
a building, wherein
the bidirectional AC/DC converter is connected between an AC power system and the first energy storage system,
the bidirectional DC/DC converter is connected between the first energy storage system and the second energy storage system,
two or more of the first energy storage system, the second energy storage system, the bidirectional AC/DC converter, and the bidirectional DC/DC converter are disposed inside the building,
the building includes a plurality of rooms,
the bidirectional DC/DC converter and the first energy storage system are respectively disposed in a first chamber that is one of the plurality of rooms and a second chamber that is another one of the plurality of rooms,
the bidirectional DC/DC converter has a first terminal connected to the first energy storage system,
the first energy storage system has a second terminal connected to the bidirectional DC/DC converter,
the first chamber and the second chamber are aligned in a vertical direction, and
the first terminal and the second terminal are disposed on a straight line extending in the vertical direction.

9. The frequency stabilizer according to claim 8, wherein the first energy storage system is an electric double layer capacitor.

10. A frequency stabilizer comprising:
a bidirectional AC/DC converter;
a bidirectional DC/DC converter;

a first energy storage system;

a second energy storage system; and a building, wherein the bidirectional AC/DC converter is connected between an AC power system and the first energy storage system, the bidirectional DC/DC converter is connected between the first energy storage system and the second energy storage system, two or more of the first energy storage system, the second energy storage system, the bidirectional AC/DC converter, and the bidirectional DC/DC converter are disposed inside the building, the bidirectional DC/DC converter and the first energy storage system are connected by a first line and a second line, the bidirectional DC/DC converter includes a plurality of bidirectional DC/DC conversion units connected in parallel to each other, each of the plurality of bidirectional DC/DC conversion units has a third terminal connected to the first line and a fourth terminal connected to the second line, and between the bidirectional DC/DC converter and the first energy storage system, a distance between the first line and the second line is equal to or less than an inter-terminal distance between the third terminal and the fourth terminal.

* * * * *